XR 3,045,210

July 17, 1962 L. W. LANGLEY 3,045,210

DIGITAL TELEMETERING APPARATUS

Filed Oct. 22, 1959

6 Sheets-Sheet 1

INVENTOR

Lawrence W. Langley

BY Burns, Doane, Benedict & Irons

ATTORNEYS

INVENTOR
Lawrence W. Langley
BY Burns, Doane, Benedict & Irons
ATTORNEYS

INVENTOR
Lawrence W. Langley
BY Burns, Doane, Benedict & Irons
ATTORNEYS

INVENTOR
Lawrence W. Langley
BY Burns, Doane, Benedict & Irons
ATTORNEYS

INVENTOR
Lawrence W. Langley
BY Burns, Doane, Benedict & Irons
ATTORNEYS

DIGITAL TELEMETERING APPARATUS

ANALOG TO DIGITAL CONVERTER

INVENTOR
Lawrence W. Langley
BY Burns, Doane, Benedict & Irons
ATTORNEYS

United States Patent Office 3,045,210

Patented July 17, 1962

3,045,210

DIGITAL TELEMETERING APPARATUS

Lawrence W. Langley, Waynesboro, Va., assignor to Dresser Industries, Inc., Dallas, Tex., a corporation of Delaware Filed Oct. 22, 1959, Ser. No. 848,088
6 Claims. (Cl. 340—150)

This invention relates to digital telemetering and, more particularly, to a digital telemetering system for transmitting indications of the outputs of transducers from slave stations to a master station, in which the transducer outputs are not stored at the slave stations for later scanning, but rather are directly coded when each transducer ouput is desired, by the use of timing circuits at the slave station.

Digital transmission is frequently used to transmit meter indications and instructions between a master station and a plurality of slave stations. One type of telemetering system employing digital transmission utilizes a sequential program by which the master station requests from each slave station in turn an indication of the output of a selected transducer at that station and the selected slave station responds with an indication of its address and the output of the selected transducer, between transmissions from the master station. With such a system, it is possible to scan all of the transducers at each of a plurality of slave stations in a very short period of time and periodically to record the outputs of the transducers. It is also possible to interrupt the cyclic transducer scanning program to transmit instructions for control operations to selected ones of the slave stations. It is further possible to provide for transmission by each slave station of an indication of any malfunction that has occurred at that station, when the station is interrogated for one of its transducer outputs.

Though digital telemetering may employ many types of communication coding, the binary-coded system, and particularly the binary-coded decimal system, is particularly useful because of the low requirements that this type of communication places on the transmission medium. A commercial embodiment of the apparatus of the present invention employs the binary-coded decimal system and, specifically, employs different frequencies for transmission of the two different binary indications. For instance, the master station may employ a first frequency to transmit binary "1" and a second frequency to transmit binary "0." The slave stations may each employ a third frequency to transmit binary "1" and a fourth frequency to transmit binary "0."

With a system of the type described above, and actually with all known telemetering systems, it is conventional to store the readings or indications of the transducers at each slave station and to extract from such storage the desired reading at the time that the reading is to be transmitted to the master station. This requires the use of storage equipment which is relatively complex and therefore expensive. The apparatus of the present invention does not employ storage of the transducer outputs, but rather provides for direct connection of these transducer outputs to the transceiver through an appropriate analog to digital converter at the time that the output of the particular transducer is requested by the master station. There is thus a direct connection between the analog to digital converter and the transmitting apparatus which permits transmission of the coded transducer outputs without intermediate storage or translation. In order that this may be accomplished, the apparatus is provided with a timing ring which is driven alternately by received bits from the master station and by a timer at the slave station when the master station is not transmitting. This timer is also employed to drive a second timer and the outputs of the two timers, called bit and digit rings, are employed to drive the analog to digital converter. The particular transducer whose output was selected by the message last received from the master station is connected to the analog to digital converter by instructions from a decoder and the digit ring in order that the selected transducer will have its output connected to the analog to digital converter at the end of reception of an interrogating message from the master station.

The present invention will now be more fully described in conjunction with drawings showing a preferred embodiment thereof. It will be appreciated that the apparatus specifically described in the drawings is not all essential to the practice of the invention and that the inventive contribution described above may be utilized in systems differing substantially from the apparatus to be described.

Figure 1:
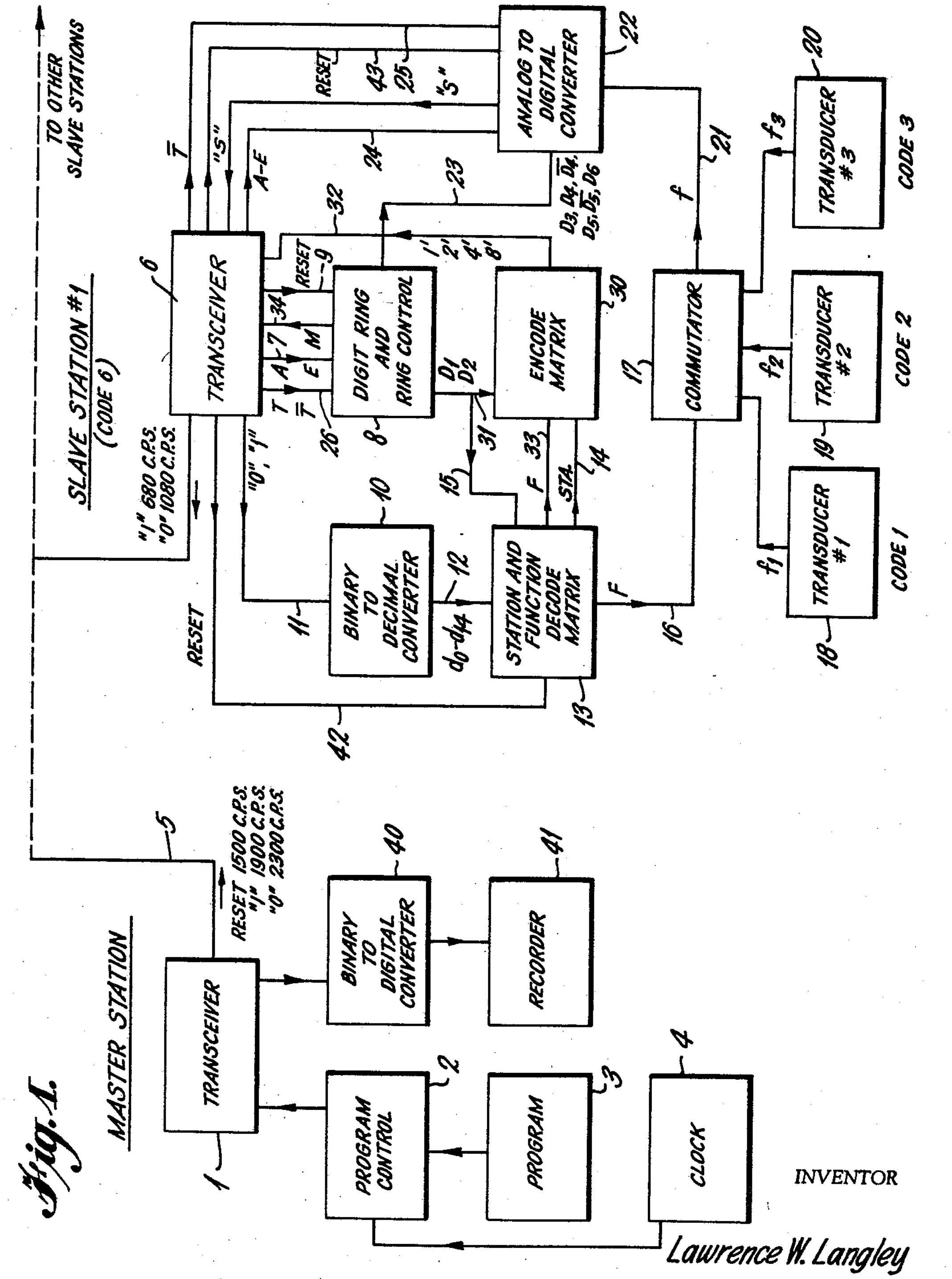
FIG. 1 is a block diagram showing the main elements of the apparatus at each of the master station and one of the slave stations of a telemetering system.
Figure 4A:
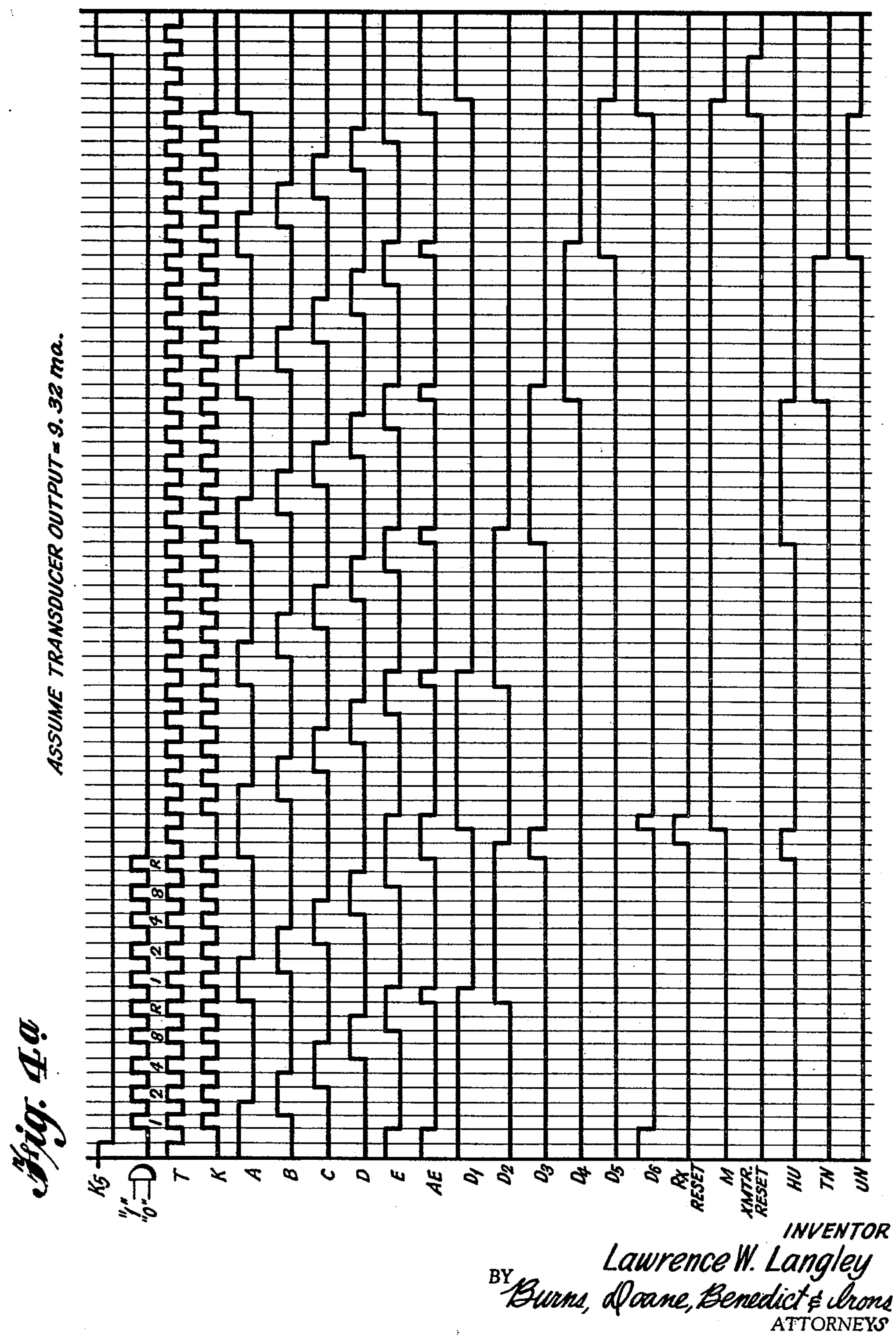
Figure 4B:
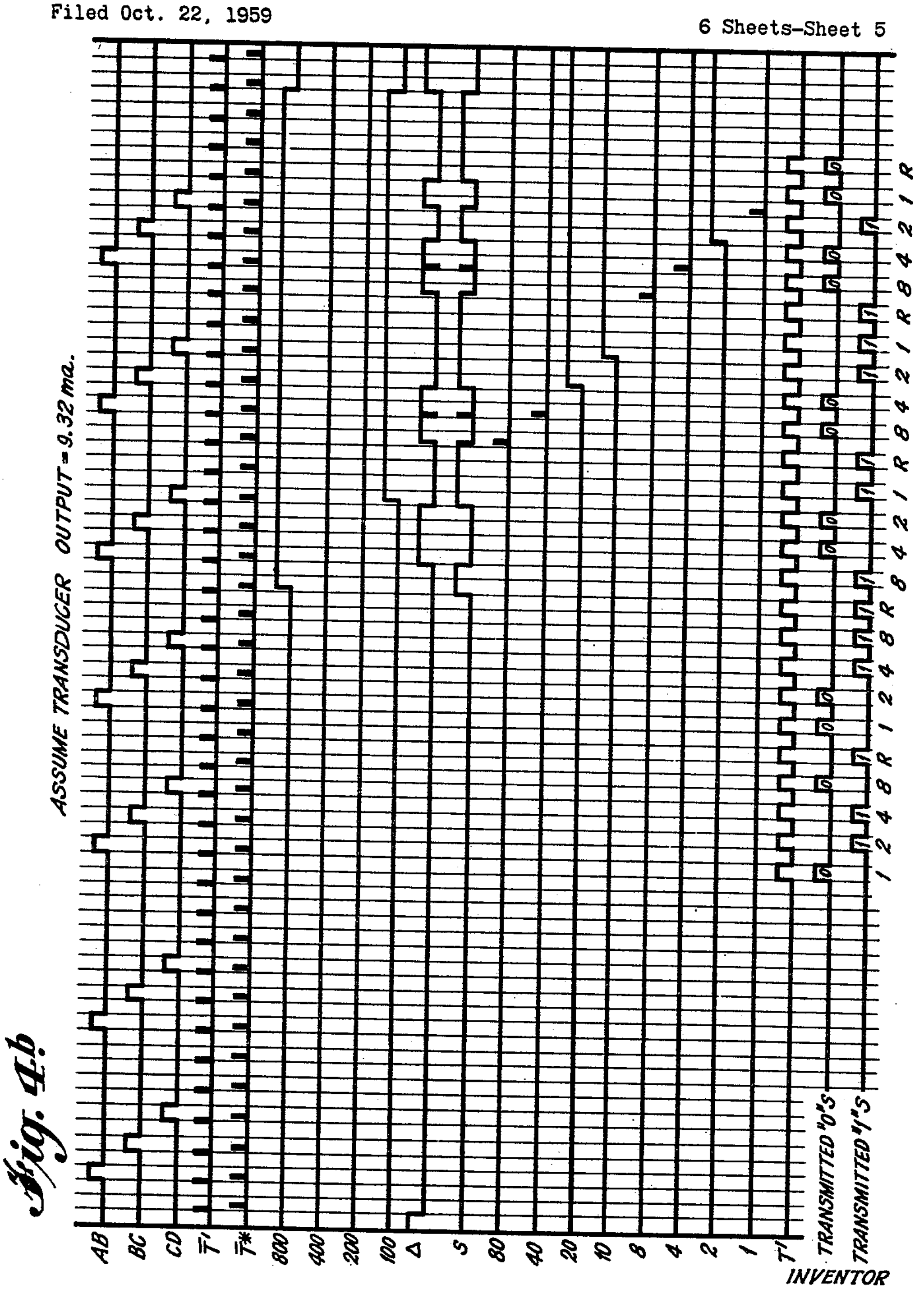
Figure 5:
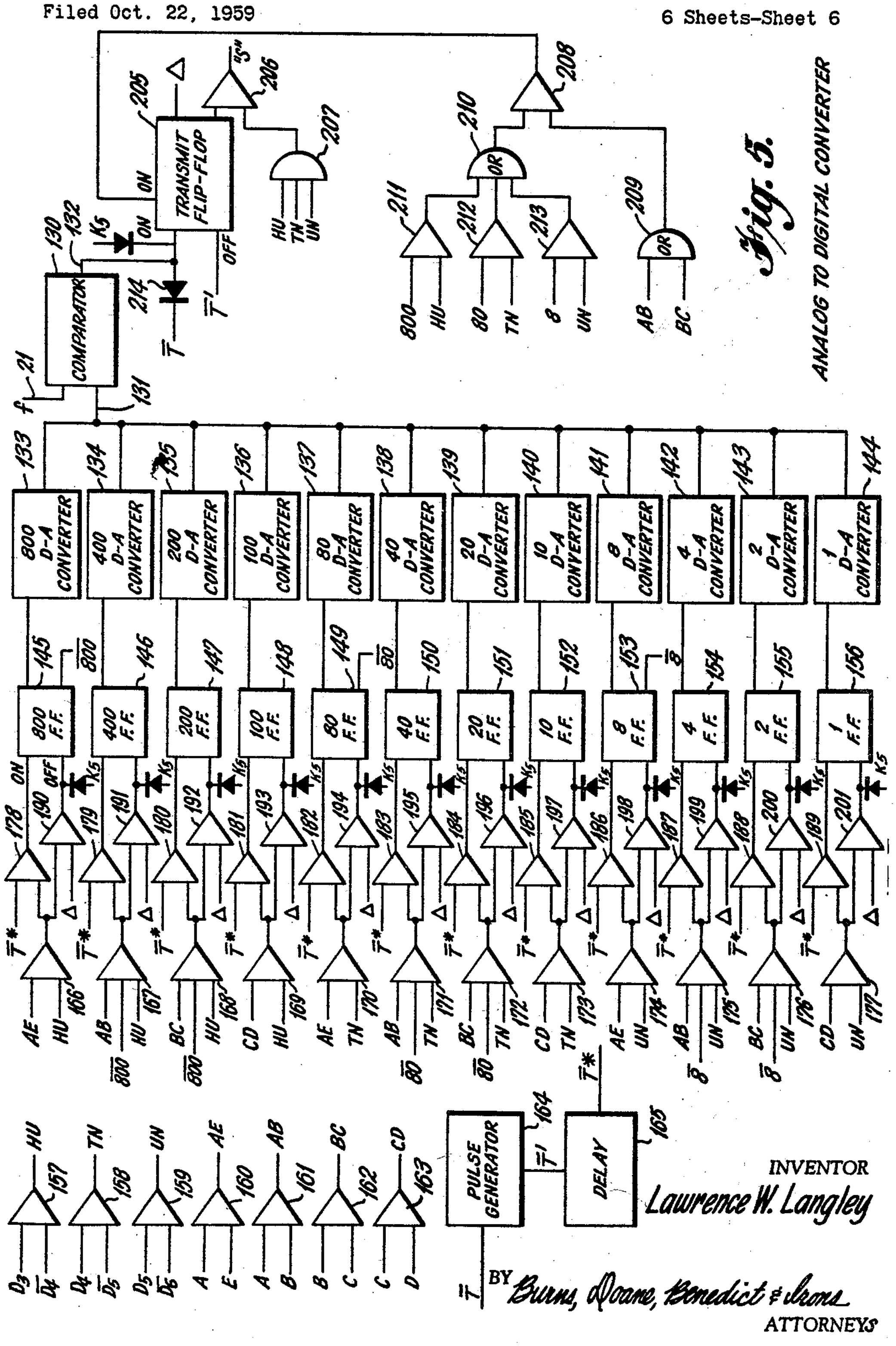

FIGS. 4*a* and 4*b* are time charts or graphs showing the time relationship between various gate voltages and signals in the apparatus of FIG. 1; and FIG. 5 is a block diagram showing in detail the elements of the analog to digital converter of FIG. 1.

Referring first to FIG. 1, the master station includes a transceiver 1 which is provided with elements enabling it to transmit three different frequencies in pulse form. Each transmission from the master transceiver initially includes a reset pulse which may be, as indicated, a 1500 cycles per second signal. The reset pulse is employed to reset the various slave stations, as will be more fully described hereinafter. The master transceiver is also capable of transmitting 1900 cycles per second and 2300 cycles per second pulses, with these two different frequency signals being employed to indicate a binary "1" and binary "0," respectively. The master transceiver transmits under control of an apparatus generally described as program control 2. This program control is itself driven by a program apparatus 3 and a clock 4. The combination of clock 4, program 3 and program control 2 are employed to cause the transceiver to periodically transmit a message to all of the slave stations requesting an indication of the output of a particularly selected transducer at a selected slave station. After each transmission from the master station, that station awaits a response from the selected slave station and, in the absence of such a response within the expected period of time, the master station is programmed to repeat the previous interrogation. After receipt of the requested information, the transceiver again transmits, this time to request a transducer output of a different slave station. When all of the slave stations have been scanned, the program causes the master station to repeat the scanning operation, this time requesting the outputs of different transducers.

As indicated above, the telemetering system preferably employs a binary-coded decimal coding and the transceiver is adapted to transmit a first digit including at least four bits whose coding identifies the particular slave station interrogated. The second digit transmitted may identify the particular transducer selected. More digits may be employed in the event that it is desired to select from a set of transducers whose number exceeds the coding capabilities of the binary-coded decimal system. An actual commercial embodiment of the system of the invention also provides for interruption of the cyclic scanning program to transmit instructions to the slave stations, which instructions might require more digits than the two digits referred to above. For simplicity's sake, however, the apparatus herein described is presumed to employ only a first digit to select the particular slave station and a second digit to select a particular transducer.

The messages transmitted by the master station are received by each of the plurality of slave stations, as indicated by the transmission line 5. This transmission line may be a telephone or telegraph line, or it may be a radio transmission medium. Each slave station has a transceiver 6 which is generally similar to the transceiver at the master station. The transceiver 6 is capable of receiving each of the three frequencies employed by the master station to transmit binary "1" and binary "0," and to reset the slave apparatus. The transceiver 6 includes a bit ring generator furnishing the central timing for the system and which will be described hereinafter. That generator is driven by the received bits at the time a message is being received from the master station and furnishes over line 7 voltage pulses A and E which are employed to drive a digit ring and ring control shown at 8. The digit ring is reset at the beginning of transmission from the master station by the reset pulse which is directed to the digit ring through line 9.

The received bits "0" and "1" from the transceiver 6 are directed to a binary to decimal converter 10 over line 11 and are there translated into independent pulses representing each of the possibly coded decimal numbers. The decimal pulses indicated as $d_0$–$d_{14}$ are supplied by line 12 to a station and function decode matrix 13. This matrix is employed to decide from the first digit received from the master station whether the particular station has been interrogated by that message. As an example, the illustrated slave station has been shown as having a code of decimal "6" and, if the first digit received by the transceiver 6 represents a decimal "6," the matrix 13 furnishes a station gate pulse through line 14 and empowers the remaining apparatus of the slave station to respond to the rest of the received message. In the event that decimal "6" is not received, however, no further action is taken by the slave station on the received message. The matrix 13 also receives digit gate pulses $D_1$ and $D_2$ over line 15 from the digit ring 8 so that it may determine which digit a particular received decimal number represents.

If the first received digit from the master station contains bits representing the decimal number "6," the matrix 13 operates on the second digit received and furnishes one of gate pulses $F_1$ through $F_3$, to select the particular transducer requested by the master station. These gate pulses are directed over line 16 to a commutator 17 to which the outputs of each of the transducers at the slave station are also connected. The drawing shows only three transducers indicated at 18, 19 and 20, but it will be apparent that many more transducers could also be connected into the system. The three transducers illustrated have been presumed to be identified by decimal codes 1 through 3, so that, if the second digit received from the master station represents a decimal 3, the matrix 13 will provide a gate pulse $F_3$ and the transducer 20 will have its output gated through the commutator over line 21 to an analog to digital converter 22. It will be noted, however, that each of the three transducers has its output continuously connected to the commutator and there is no storage involved in the system.

In the analog to digital converter, the output of transducer 20 is sequentially compared with a plurality of different amplitude signals. The sequence of this comparison is controlled by the digit ring 8 which supplies certain indicated digit gate pulses along line 23, by the bit ring in the transceiver 6 which supplies bit gate pulses A through E along line 24, and by a cyclic timer pulse $\overline{T}$ from the transceiver supplied along line 25. The timer pulse $\overline{T}$ and its complement T are also supplied to the digit ring 8 along line 26, to control cycling thereof. The sequential comparison of the different amplitude standard signals with the transducer signal will be more fully described hereinafter. Suffice it to say at this point that the output of the analog to digital converter consists of pulses which cause the transceiver 6 to transmit "0" and "1" bits in the binary-decimal code, indicating the output of the selected transducer 20.

In the paragraph immediately above, the operation of the analog to digital converter 22 which causes the slave station to transmit "0" and "1" bits representative of the indication of the selected transducer was described. The transceiver 6 is capable of transmitting pulses of two different frequencies, representing binary "1" and binary "0," in order that this indication function may be performed. In a commercial embodiment, pulses representing binary "1" were of 680 cycles per second and pulses representing binary "0" were of 1080 cycles per second. With this frequency separation between pulses transmitted from the master station and pulses transmitted by the slave stations, there is no problem in distinction between the two sets of pulses and only the master transceiver is capable of decoding the transmitted pulses from any one of the slave stations.

The coding of the output of the particular transducer 20 selected by the message from the master station is preceded by coded identifications of the station responding and the transducer whose output is being indicated. In order to accomplish this, the station gate pulse supplied by the matrix 13 at the time of receipt of the decimal code "6" indicating the particular slave station is directed to an encode matrix 30. This matrix is also driven by the digit ring and ring control 8 through line 31, and its output is directed along line 32 to the transceiver. The output of the encode matrix causes the transceiver to transmit during its first-transmitted digit binary pulses representing the decimal "6" code of the slave station. The matrix 13 also supplies a function gate pulse along line 33 to the encode matrix, and the matrix causes the transceiver to encode its second-transmitted digit with a binary indication of the decimal code (decimal "3") corresponding to the selected transducer (transducer 20 in the illustrative embodiment).

It was indicated above that the bit ring in the transceiver 6 was driven during reception of signals from the master station by the received signals. However, during the transmission from the slave station to the master station, there are necessarily no received signals. At this time, the bit ring is cycled by pulses from the timer in the transceiver, by virtue of a gate pulse M supplied along line 34 from the digit ring to the bit ring generator. The timer pulses have been previously identified as "T" and its complement "$\overline{T}$." It will be apparent therefore that a common bit ring and a common digit ring are employed for control of the slave station apparatus during both reception from the master station and transmission to the master station.

Each digit transmitted by the slave station is received by the transceiver 1 at the master station and supplied as sequential pulses to the binary to digital converter 40. The output of this converter is directed to a recorder 41 which may record each transmission from a slave station. The recording may be a decimal indication of the code of the particular slave station replying followed by a decimal indication of the particular transducer whose output is being transmitted and then followed by a decimal indication of the output of that transducer. Alternatively, the master station may be provided with apparatus that will translate the digital code of the particular slave station and the particular transducer into word identifications thereof. In the actual commercial embodiment of this apparatus, a typewriter is employed to record the messages received from the slave stations. However, the system operates so fast in its transmission that it is unnecessary to record each message received. The commercial embodiment provides for automatic printout of the transducer indications once each hour of the day and merely records information received between the printout times in buffer storage. The commercial embodiment also provides for comparison of the transducer readings in buffer storage with the readings obtained in the previous hourly printout. In the event that any new reading in buffer storage departs from the previously recorded reading by more than a preselected amount, the program of the system is changed to provide for operation of an alarm and for automatic printout at that time. For the purposes of simplicity, in description of this present invention, however, it will be assumed that all transmissions from the slave stations are recorded by recorder 41.

It has been indicated that each transmission from the master station includes initially a reset signal which is received by all slave stations. At the slave stations, this reset signal is directed along line 42 to station and function decode matrix 13 to reset that matrix to its standby condition. The reset pulse is also directed to the analog to digital converter 22 along line 43 to reset the converter to its initial condition. It has been indicated previously that the digit ring is reset at this time by the pulse received along line 9. The bit ring in the transceiver is also similarly reset. Each slave station is then ready to act upon a new message from the master station.

Figure 2:
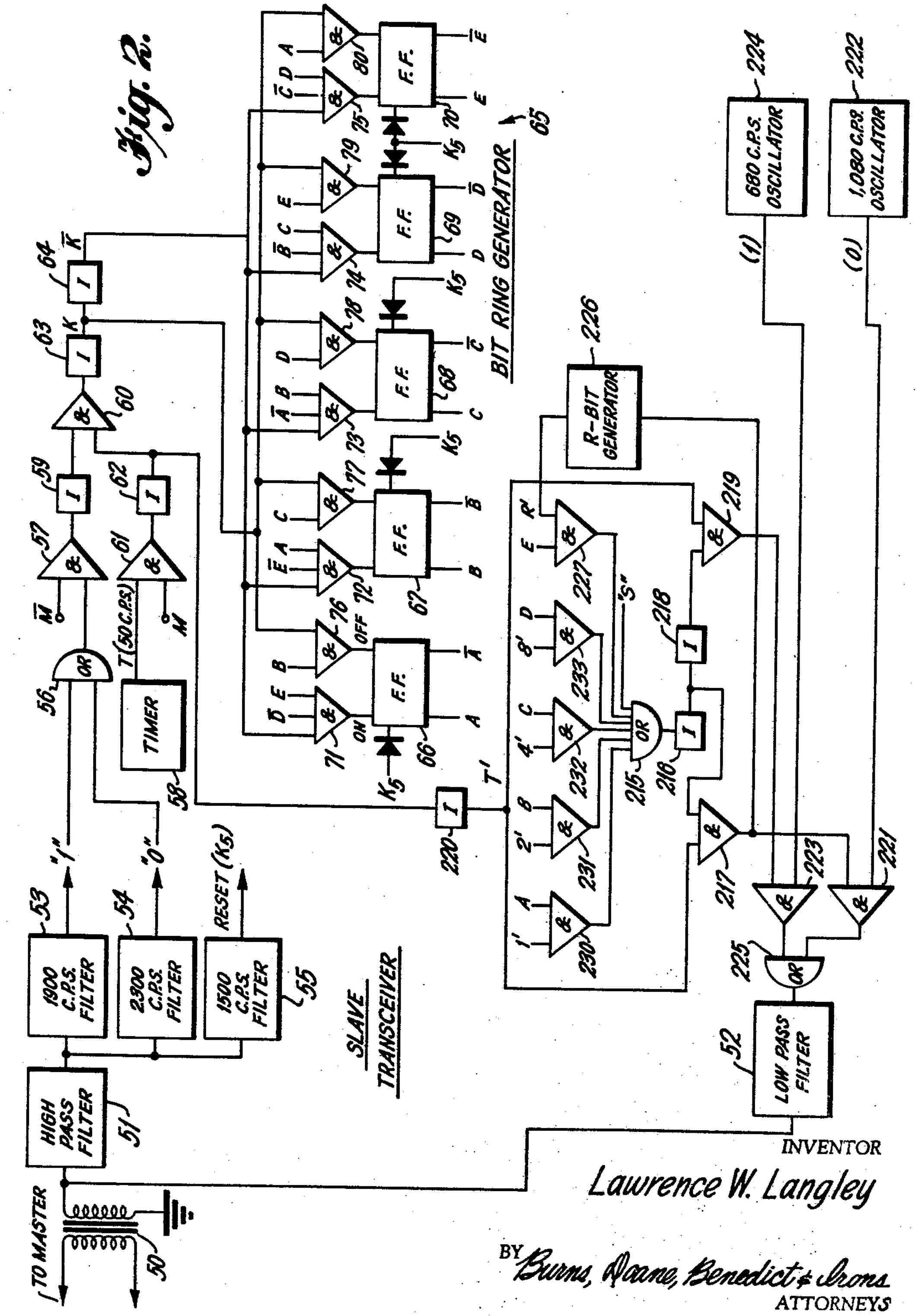
FIG. 2 is a block diagram showing in detail the elements of the slave transceiver of FIG. 1.

Referring now to FIG. 2, the transceiver 6 is therein illustrated in detail. The transceiver includes a coupling transformer 50 whose primary winding is connected to the telephone line or to a radio transmitter, whichever is used. The secondary of the transformer 50 has a high pass filter 51 and a low pass filter 52 connected across it. The high pass filter 51 is designed to pass all of the frequencies transmitted from the master station and to block the low frequencies transmitted by the low pass filter from the slave transmitter. The output of high pass filter 51 is further subdivided by filters 53 through 55, respectively centered about the binary "1" frequency, the binary "0" frequency and the reset frequency. The reset output from the filter is identified throughout the rest of the application as $K_5$ for the reason that it is the fifth of the frequencies employed in the system. Of course, suitable amplifiers and shapers may be employed in the transceiver, but they are omitted from this application for the purpose of simplicity.

The outputs of the filters 53 and 54, the binary "1" and the binary "0" are connected to a logical "OR" circuit 56. The output or "OR" circuit 56 is connected to one input of a logical "AND" circuit 57. The other input of "AND" circuit 57 is supplied with a gate pulse $\overline{M}$ whose generation will be described hereinafter. Suffice it to say at this time that pulse $\overline{M}$ is always present when the slave transceiver is receiving a message from the transmitter.

It is appropriate to state at this time that the presence of a signal is indicated by a simple letter or combination of letters, while the absence of the same signal is indicated throughout by the letter(s) with a bar thereover, indicating the logical "NOT." In the commercial embodiment of the present invention, the presence of a signal is indicated by a +10 volts level, while the absence of the signal is indicated by a ground level. Also in the commercial embodiment, the basic timer in each transceiver, indicated at 58 in FIG. 2, delivers a 50 cycles per second square wave voltage. The transmitting apparatus of both the master station and each of the slave stations are designed to transmit binary "1" and binary "0" each for 10 milliseconds, corresponding to a half cycle of timer 58, and to separate each binary indication by the same period.

When a message is being received by the slave transceiver from the master station, the gate pulse $\overline{M}$ is always present and the received binary signals are passed through an isolating inverter 59 to one input of a logical "AND" circuit 60. The output of the timer 58 is supplied to one input of an "AND" circuit 61, while the other input to the "AND" circuit is supplied with the gate pulse "M," the inversion of $\overline{M}$. Since the transmit gate pulse M is not on during reception, the output of "AND" circuit 61 is at ground at this time. This output is connected to the second input of "AND" circuit 60 through an isolating inverter 62. As a result, one input to "AND" circuit 60 is always present and the other input is present in the interval between received bits. The ouput of "AND" circuit 60 is connected to an inverter 63 so that the output of this inverter follows the received bits during reception from the master station. This output signal is designated K in the drawings and its inversion supplied through inverter 64 is designed $\overline{K}$.

The signals K and $\overline{K}$ cycle the bit ring generator indicated generally by the reference numeral 68. The bit ring generator includes five flip-flops identified at 66 through 70. Each of these flip-flops has an "On" input and an "Off" input, and a corresponding "On" and "Off" output. A logical "AND" circuit having three inputs is connected to the "On" input of each of the flip-flops 66 through 70 and identified respectively by the numerals 71 through 75. A logical "AND" circuit having two inputs is connected to the "Off" input side of each of the flip-flops 66 through 70 and identified by the reference numerals 76 through 80.

The "On" output sides of the flip-flops 66 through 70 provide the voltage gates A through E, respectively, while the "Off" output sides provide the gates $\overline{A}$ through $\overline{E}$, respectively. As indicated in the drawing, "AND" circuits 71 through 75 are each provided with the signal $\overline{K}$, while "AND" circuits 76 through 80 are each provided with the signal K. These "AND" circuits are also provided with combinations of the various output gate pulses from the flip-flops 66 through 70, as indicated in the drawing. Connections of the outputs of these flip-flops to the various "AND" circuits to supply these gates are not shown, for simplicity purposes.

As will be more fully described hereinafter in connection with a timing diagram for the system, the bit ring generator provides, during its cyclic operation, gate pulses A through E, each of which is present for 30 milliseconds, and gate pulses $\overline{A}$ through $\overline{E}$, each of which is present for 70 milliseconds. These gate pulses are used in various portions of the other elements of the slave station, as has been indicated in connection with FIG. 1. In particular, they are employed to drive the digit ring generator shown in FIG. 3.

For clarity of description, the operation of the digit ring generator will now be described and this description will return to the remaining elements of FIG. 2 hereinafter.

Figure 3:
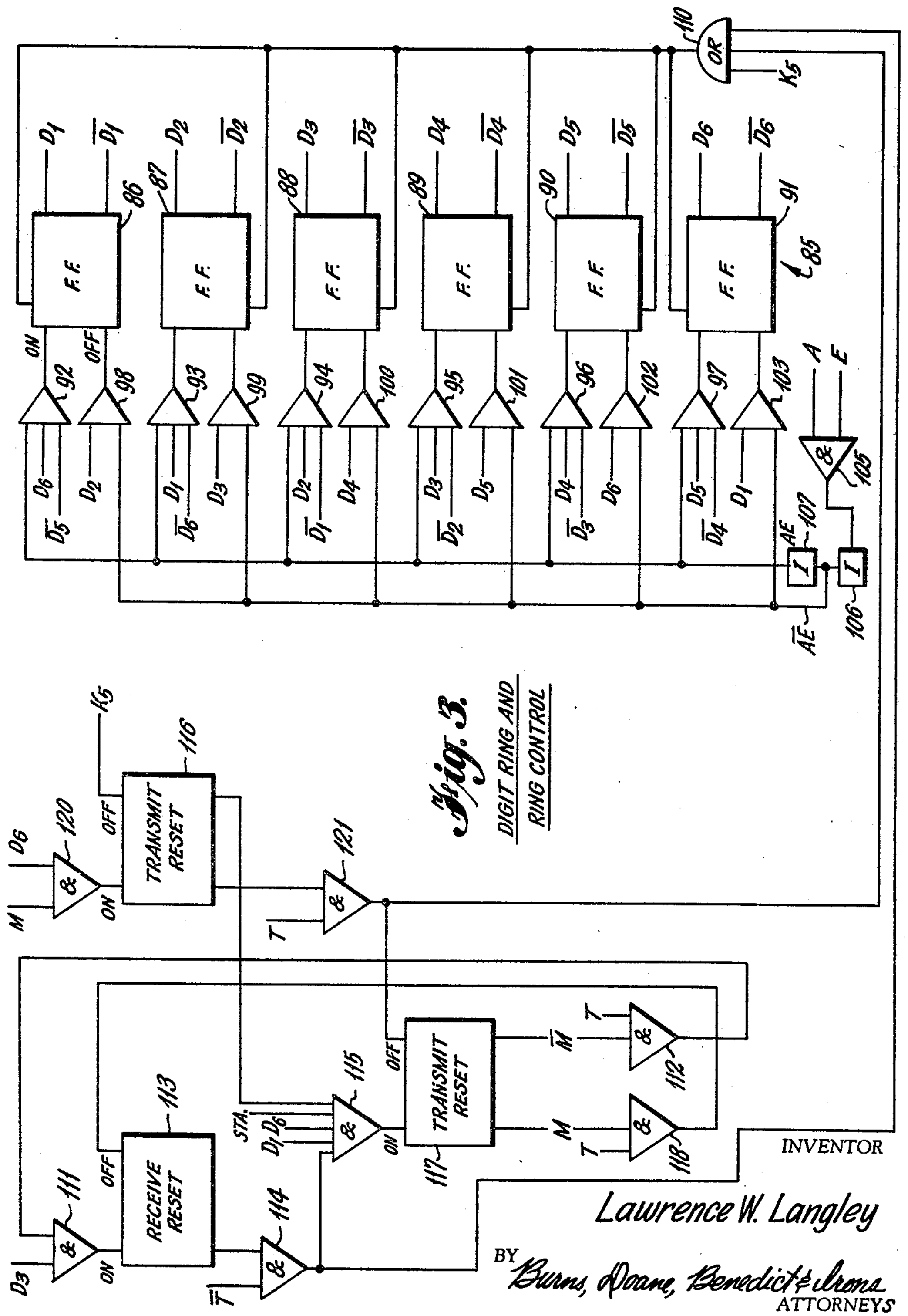
FIG. 3 is a block diagram showing in detail the elements of the digit ring and ring control of FIG. 1.

Referring now to FIG. 3, the digit ring generally indicated at 85 includes six flip-flops 86 through 91. The "On" inputs of these flip-flops are connected to the outputs of logical "AND" circuits 92 through 97, while the "Off" inputs are connected to the outputs of "AND" circuits 98 through 103, respectively.

The gate pulses A and E from the bit ring generator 65 of FIG. 2 are connected in FIG. 3 to an "AND" circuit 105, so that there is an output pulse from "AND" circuit 105 whenever the gate pulses A and E exist simultaneously. There is therefore a 10 volt output from "AND" circuit 105. The output of the "AND" circuit is connected through an inverter 106 to one input of each of the "AND" circuits 98 through 103 connected to the "Off" inputs of the digit ring flip-flops. This output signal is indicated as $\overline{AE}$. The output of inverter 106 is connected through inverter 107 to one input of each of "AND" circuits 92 through 97 connected to the "On" input side of the flip-flops 86 through 91, respectively. The other inputs of the "AND" circuits 92 through 103 are derived from the "On" and "Off" output sides of the digit ring flip-flops, as indicated by the letters and numerals shown in the figure.

The operation of the bit ring generator and the digit ring generator will now be described in conjunction with a time chart or graph forming FIG. 4 and showing the various involved gates and pulses in their operation.

As has been indicated hereinabove, the first signal transmitted by the master station is a reset tone, identified as $K_5$. The output of the 1500 cycles per second filter 55 of FIG. 2 therefore provides a +10 volts gate pulse at this time. This gate pulse is supplied in FIG. 2 to the "On" sides of bit ring flip-flops 66 and 70 and to the "Off" sides of the remaining flip-flops 67 through 69. Flip-flops 66 and 70 are therefore on so that the gate pulses A and E are present, as shown in FIG. 4, but the remaining gate pulses B through D are not present.

The reset gate pulse is also supplied through a logical "OR" circuit 110 in FIG. 3 to the "On" sides of digit ring flip-flops 86 and 91 and to the "Off" sides of flip-flops 87 through 80. Digit gate pulses $D_1$ and $D_6$ are therefore on at this time while the remaining digit gates are off.

FIG. 4 indicates that the reset tone is turned off 10 milliseconds after the origin of the graph. After a delay of 10 more milliseconds, the transmitter begins to transmit binary-coded decimal pulses in two digits, the first digit indicating the station address and the second digit indicating the transducer whose output is desired. The second trace of FIG. 4 indicates these received binary digits. They are respectively in the 1, 2, 4, 8, and "R" positions and since either a "1" or a "0" is always transmitted in these positions, the output of the "OR" circuit 56 of FIG. 2, indicated by the second trace of FIG. 4, consists of 10 volt pulses of 10 milliseconds each, each separated by 10 milliseconds periods.

The "R" code position has not been referred to hereinabove. However, in digital telemetering, it is conventional to employ a checking or "redundancy" bit as a part of each digit transmitted. This bit is generated at each of the master and slave stations following the four information bits and is conventionally employed to provide that each digit transmitted contain either an odd number or an even number of one of the binary indications. In the commercial embodiment of this invention, the "R-bits" are employed to provide an odd number of binary "1's" in each digit. A checking circuit is provided at the master station to reject all digits which contain an even number of binary "1's", so that erroneous messages are not recorded. At the slave stations, the received "R-bits" are employed to key the received information bits from the transceiver through to the other apparatus. As a matter of fact, at both the slave and master stations the received bits are sent to buffer storage upon reception and are acted upon only during receipt of the "R-bit," so that the binary to decimal converter 10 of the slave station, and the binary to digital converter 40 at the master station, receive the bits parallel by bit, serial by digit.

The redundancy checking feature generally described above does not form a part of the invention of this application, so that the circuitry involved in this checking feature will not be described herein.

It has been indicated above that the transmit gate pulse M is not present during reception at the slave station. Therefore, the K and $\overline{K}$ signals for cycling of the bit ring generator are derived from the received bits. As shown in FIG. 4, the K pulses correspond with the received bits. The first K pulse combines with the A gate pulse to turn off the flip-flop 70 and therefore to turn off the E gate circuit. The following $\overline{K}$ pulse combines with the $\overline{E}$ gate pulse and the A gate pulse to turn on the flip-flop 67 and thereby turn on the B gate circuit. The next K pulse combines with the B gate pulse to turn off flip-flop 66 and therefore turn off the A gate circuit.

The bit ring continues to cycle in the manner indicated and shown by the respective gate pulses A through E in FIG. 4.

The A and E gate pulses are combined together in FIG. 3 to control the digit ring generator. As indicated above, the fifth frequency gate pulse $K_5$ turned on gate $D_1$ and $D_6$. $D_6$ is turned off by the combination of $D_1$ and $\overline{AE}$ when the E gate is turned off. $D_2$ is turned on by the combination of $\overline{D}_6$, $D_1$ and AE. When AE drops away, $D_1$ is turned off by the combination of $D_2$ and $\overline{AE}$. $D_3$ is turned on by the next AE gate, combining with $D_2$ and $\overline{D}_1$.

When $D_3$ comes on, the last bit has been received from the master station. It is desired, therefore, to prepare the slave station which has been selected by the first-received digit to transmit an indication of its selected transducer output. Referring again to FIG. 3, the $D_3$ gate pulse is provided to one input of an "AND" circuit 111, shown at the left-hand side of that figure. The other input of "AND" circuit 111 is supplied from an "AND" circuit 112 which receives the gate pulse T and the gate pulse $\overline{M}$. As indicated above, pulse $\overline{M}$ is present while the slave station is receiving, and the timer 58 periodically supplies the gate pulse T. Therefore, when the gate pulse T coincides with digit gate pulse $D_3$, there is a +10 volts output from "AND" circuit 111. This output is supplied to the "On" side of a receive reset flip-flop 113. That flip-flop has been off but is turned on by the coincidence of pulses T and $D_3$. The output of the "On" side of the receive reset flip-flop is supplied to one input of an "AND" circuit 114. The other input of "AND" circuit 114 is pulses $\overline{T}$, so that there is an output from "AND" circuit 114 when the next pulse $\overline{T}$ arrives. This output is supplied to "OR" circuit 110 to reset the digit ring 85 to its initial condition. FIG. 4 shows this combination of circumstances.

It is presumed that the first digit of the message received from the master station contained the decimal code of the slave station being described. The station and function decode matrix 13 of FIG. 1 therefore provides a station gate pulse at this time. This station gate pulse is connected with gate pulses $D_1$ and $D_6$ to inputs of an "AND" circuit 115 of FIG. 3. The other inputs to the "AND" circuit are taken from the output side of "AND" circuit 114 and the "Off" output side of a transmit reset flip-flop 116. The "Off" input side of the flip-flop 116 is supplied with the reset frequency, so that it is off at this time and the coincidence of an "On" input from the receive reset pulse 113, pulses $\overline{T}$, $D_1$, and $D_6$, the station gate pulse, and the "Off" output of the transmit reset circuit 116 develops an output at "AND" circuit 115. This output is supplied to the "On" side of a transmit gate flip-flop 117 and turns the flip-flop on. The "On" output side of this gate is the M or transmit gate pulse employed in various portions of the apparatus. In FIG. 4, it is shown that the M gate pulse goes on at $\overline{T}$ time after the gate pulse $D_3$ goes on.

The transmit gate pulse M prepares the equipment for transmission from the slave station, but before the sequence of events causing such transmission is described, the operation of the apparatus of FIG. 3 to turn the receive reset flip-flop 113 off will be described. The "On" output of the transmit gate 117 is connected to one input of an "AND" circuit 118. The other input to "AND" circuit 118 is the T gate pulse. The output of "AND" circuit 118 is connected to the "Off" input side of the receive reset flip-flop. Therefore, after the transmit gate circuit is turned on, the next T gate pulse turns the receive reset flip-flop off. This operation is also shown in FIG. 4.

Turning now to the operation of the bit ring generator during transmission from the master station, the coincidence of the timer gate pulse T and the transmit gate pulse M provides the ring advance gate pulses K and $\overline{K}$. It will be seen that the gate pulse K follows the gate pulse T during the time that the transmit gate circuit is on. The bit ring generator cycles automatically in the manner described above as long as the transmit gate pulse M is present. The sequence of operations of the components of the bit ring generator may be seen clearly from FIG. 4 and will not be described herein.

The digit ring generator of FIG. 3, being driven by the gate pulses A and E from the bit ring generator, also cycles automatically. However, the length of the cycle during the transmit time of the slave station is different from the length of that cycle during the received time. The reason for this is that the slave station must not only identify itself and the selected transducer, which requires two digits, but it must also transmit a binary-coded decimal indication of the instantaneous transducer output. In the embodiment of the invention illustrated herein, three digits are employed to represent the transducer output, so that a total of five digits must be transmitted by the slave station.

The digit ring generator therefore cycles continuously until gate pulse $D_6$ is turned on. This indicates that all five digits of the message have been transmitted and the slave station apparatus must be returned to its receiving condition. Referring to FIG. 3, the coincidence of the transmit gate pulse M and the digit ring gate pulse $D_6$ at the inputs to an "AND" circuit 120 turns on the transmit reset flip-flop 116 at this time. The "On" output of the transmit reset is supplied, with the timer gate pulse T, to an "AND" circuit 121. The output of "AND" circuit 121 is connected to the "Off" input of transmit gate flip-flop 117, so that the transmit gate pulse M is turned off at T time following the incidence of the $D_6$ gate pulse. This sequence is shown in FIG. 4.

The output of "AND" circuit 121 is also supplied to reset "OR" circuit 110 so that the digit ring generator is reset at this time.

The next event which occurs is the reception of the reset frequency from the master station. A new cycle of operations then begins.

The operation of the analog to digital converter 22 of FIG. 1 will now be more fully described. Referring to FIG. 5, the converter includes a comparator 130 which may be of the type described in an application to Henry B. Patterson, Jr., Serial No. 846,867, titled "Signal Comparator," filed October 16, 1959, and assigned to the same assignee as the present application. The comparator 130 is supplied with the output of the selected transducer over line 21 and with the output of a plurality of current sources added together and connected to the second input of the comparator over line 131. The operation of the comparator is fully described in the Patterson application identified above and suffice it to say at this point that the comparator compares the opposite polarity standard signal from line 131 with the analog signal from line 21 and supplies different outputs at line 132, depending upon the relative magnitudes of the inputs. In the commercial embodiment of this apparatus, the transducer signal is a negative current and the standard signal is a positive current. If the negative current is larger than the positive current, line 132 is at ground, but if the positive current is the larger, the line 132 is at +10 volts.

The positive standard currents to be compared with the transducer current are supplied by a set of digital to analog converters 133 through 144. These converters when turned on each furnish a different amplitude current which are respectively in the 800 to 1 progression of the binary-coded decimal coding. The converters are arranged to be turned on in sequence, with the 800 to 100 converters 133 through 136 turned on respectively during the four information bit times of the third digit, the 80 to 10 converters 137 through 140 turned on respectively during the same bit periods of the fourth digit, and the 8 to 1 converters 141 to 144 respectively turned on during the fifth digit.

The digital to analog converters 133 through 144 are respectively controlled by flip-flops 145 through 156. These flip-flops are each turned off during reception of the reset frequency, $K_5$, and are turned on sequentially during the analog to digital conversion sequence in a manner now to be described.

Various ones of the digit gates and various ones of the bit gates are combined together in a series of "AND" circuits 157 through 163. The "AND" circuit 157 receives digit gate pulse $D_3$ and digit gate pulse $\overline{D_4}$ and provides at its output a "hundreds" gate pulse identified as "HU." "AND" circuit 158 receives digit gate pulses $D_4$ and $\overline{D_5}$ and provides a "tens" gate pulse identified as "TN." "AND" circuit 159 translates digit gate pulses $D_5$ and $\overline{D_6}$ into a "units" gate pulse "UN." As their names imply, these three gate pulses establish hundreds, tens and units time for the analog to digital conversion procedure.

The "AND" circuits 160 through 163 combine various identified ones of the bit gate pulses to provide sequential ten milliseconds gate pulses AE, AB, BC, and CD. All of these gate pulses are employed in operation of the flip-flop switching means 145 through 156. Also employed is the $\overline{T}$ output of the timer 58 of FIG. 2. This cyclic voltage is supplied to a pulse generator 164 which forms a 20 microseconds pulse initiated at the beginning of each $\overline{T}$ gate pulse and identified as $\overline{T}'$. The pulses $\overline{T}$ and $\overline{T}'$ are each employed in the conversion apparatus but $\overline{T}'$ is additionally supplied to a delay means 165 which furnishes at its output a 20 microseconds pulse $\overline{T}$* which begins 20 microseconds after the initiation of the pulse $\overline{T}'$.

The switching flip-flops 145 through 156 are controlled by "AND" circuits 166 through 177, respectively. These "AND" circuits receive the gate pulses shown in FIG. 5 and have their outputs connected respectively to further sets of "AND" circuits 178 through 189 and 190 through 201. The "AND" circuits 178 through 189 are respectively connected to the "On" input sides of switching flip-flops 145 through 156 and the "AND" circuits 190 through 201 are respectively connected to the "Off" input sides of the same flip-flops.

Turning now to the comparator 130, the ground or +10 volts on line 132, depending upon which of the two input signals is the larger, is supplied to the "On" input side of transmit flip-flop 205. When the transmit flip-flop is on, its output provides a gate pulse identified by the Greek letter "delta." As indicated in the drawing, the "AND" circuits 190 through 201 connected to the "Off" sides of flip-flops 145 through 156 are each provided with this gate pulse delta.

The gate pulse $\overline{T}'$ developed by pulse generator 164 is supplied to the "Off" side of the transmit flip-flop 205 and the output from the flip-flop, when it is off, is supplied to an "AND" circuit 206. This "AND" circuit 206 is also supplied with any one of the gate pulses "HU," "TN," and "UN," through an "OR" circuit 207. The output of "AND" circuit 206 consists of keying gate pulses "S" for the transceiver of FIG. 2.

The "On" side of transmit flip-flop 205 is supplied with the reset frequency $K_5$ and also with the output of an "AND" circuit 208. This "AND" circuit receives one input from an "OR" circuit 209 whose inputs are the gate pulses AB and BC. The other input to "AND" circuit 208 is obtained from the output of an "OR" circuit 210. The three inputs to this "OR" circuit are provided by "AND" circuits 211 through 213 which are supplied with the various gate pulses indicated.

In operation of the analog to digital converter, at "hundreds" time which, of course, occurs during the third digit gate pulse, with the AE gate pulse on, the transmit flip-flop 205 is off and the pulse $\overline{T}$* arrives to turn on the 800 flip-flop 145. The 800 converter 133 is therefor turned on to supply a current of 8 milliamps. to the comparator 130. Assuming that the output of transducer 20 of FIG. 1 is 9.32 milliamps., the output line 132 of the comparator 130 is at ground, so that the transmit flip-flop 205 remains off. The next event occurs at AB time, but it wil be noted that the AB and HU gate pulses are combined in "AND" circuit 167 with the output $\overline{800}$ from the "Off" side of 800 flip-flop 145. Since the flip-flop is on at this time, there is no output from "AND" circuit 167 and the 400 digital to analog converter is not turned on. At this time, however, the gate pulses AB, 800 and HU all coexist so that the "AND" circuit 208 furnishes +10 volts to the "On" side of transmit flip-flop 205, turning the flip-flop on and providing the signal "delta" at the "On" output. This signal, however, has no effect at this time.

When the next pulse $\overline{T}'$ arrives, the transmit flip-flop 205 is turned off, thus turning off the "delta" gate pulse. This pulse coincides with the initiation of the CD gate pulse but, since the 800 flip-flop is on at this time, the 200 flip-flop 147 cannot be turned on. The transmit flip-flop therefore remains off.

When the gate pulse CD arrives and the subsequent pulse $\overline{T}^*$ reaches the 100 flip-flop 148, the 1 milliamp. output of the converter 136 is added to the 8 milliamps. output of converter 133 to furnish a standard signal of 9 milliamps. to the comparator. The transducer output, however, is still larger than the standard, so that the output line 132 of the comparator remains at ground and the transmit flip-flop is not turned on.

Next, the "tens" gate pulse TN arrives along with the AE gate pulse. When $\overline{T}^*$ comes up, the 80 flip-flop 149 is turned on, thus adding 0.8 milliamp. to the standard signal. The total standard signal is therefore higher than the transducer signal and the comparator furnishes a +10 volts output on line 132. This turns on the transmit flip-flop 205 causing it to furnish a gate pulse "delta" at its "On" output side. The gate pulse "delta" immediately combinates with gate pulses TN and AE to turn off the 80 flip-flop. The next $\overline{T}'$ pulse turns off the transmit flip-flop to turn off the delta gate pulse. However, 20 microseconds later the $\overline{T}^*$ pulse coincides with pulses AB and TN, so the 40 flip-flop 150 is turned on to add 0.4 milliamp. to the standard signal. Again, the standard signal is higher than the analog, so that the +10 volts output of the comparator turns on the transmit flip-flop. The arrival of the next $\overline{T}'$ pulse once again turns off the transmit flip-flop.

The next gate pulse to arrive is BC and, when the $\overline{T}^*$ pulse arrives, the 20 flip-flop 151 is turned on 0.2 milliamp. is then added to the standard signal, but since the standard signal is then less than the analog signal, there is no +10 volts output from the comparator to turn the transmit flip-flop on and the flip-flop remains off. Then, the CD gate pulse arrives and coincides with the $\overline{T}^*$ pulse to turn on the 10 flip-flop. The transmit flip-flop remains off because the standard signal is then 9.3 milliamps. which is less than the transducer signal of 9.32 milliamps.

The same sequence follows through the 8, 4, 2, and 1 series with the 8 and 4 flip-flops being turned off immediately after they are turned on because their incremental currents of 0.08 and 0.04 milliamp. cause the standard signal to be larger than the transducer signal. The 2 flip-flop 155, however, is turned on during BC time and remains on. The 1 flip-flop is turned on at CD time but is immediately turned off because the standard signal then exceed the analog signal.

The various gate pulses and signals described above in connection with the analog to digital converter are shown in FIG. 4. It will be noted that the "S" signal from the "AND" circuit 206 at the output side of the transmit flip-flop is not merely the inverse of the "delta" or "too large" gate, since the "Off" side of the transmit flip-flop is anded with the output of the "OR" circuit 207. However, at any one of "hundreds," "tens" and "units" times, the "S" output is the inverse of the "delta" output.

Since the transducer signal supplied to comparator 130 is not stored or frozen, there is a possibility that the signal could change during the conversion cycle in such direction and by such magnitude as to change the ground signal at the comparator output to +10 volts and thereby turn the transmit flip-flop on. If this occurs during T time, improper transmitter operation might occur. Therefore, the $\overline{T}$ gate pulse is supplied to the "On" input side of the transmit flip-flop 205 through diode 214. At $\overline{T}$ time this diode is back-biased by the +10 volts of the $\overline{T}$ gate pulse, but at T time the diode cathode is grounded and any + signal at the comparator output at this time is shunted to ground and therefore cannot turn the flip-flop on.

Returning now to FIG. 2, the operation of the transmitting portion of the slave transceiver to transmit the binary-coded representation of the transducer output will be described. The "S" signal output from the "AND" circuit 206 in FIG. 5 is supplied in FIG. 2 to an "OR" circuit 215. The other inputs to that "OR" circuit will be described hereinafter. The output of the "OR" circuit is supplied through an inverter 216 to one input of an "AND" circuit 217, and through a second inverter 218 to one input of an "AND" circuit 219. The timer output from the "AND" circuit 61 and the inverter 62 is connected through an inverter 220 to each of the "AND" circuits 217 and 219 and is identified as T'. This gate pulse is merely the output of timer 58 at the time when the transmit gate pulse M is on. The pulse gate T' is shown in FIG. 4 and is seen to coincide with the T gate pulse in that figure.

The output of "AND" circuit 217 is supplied to one input of an "AND" circuit 221 whose other input is derived from the "0" bit oscillator 222. The output of the "AND" circuit 219 is supplied to one input of an "AND" circuit 223 whose other input is derived from the "1" bit oscillator 224. Therefore, when there is a +10 volts output from "AND" circuit 217, there is a 1080 cycles per second voltage available at the output of "AND" circuit 221. When there is an output from "AND" circuit 219, there is 680 cycles per second output from "AND" circuit 223. The outputs of these two "AND" circuits are combined in an "OR" circuit 225 whose output is supplied through low pass filter 52 to the coupling transformer 50.

The output of "AND" circuit 217 is also supplied to an "R bit generator 226. This generator counts the number of "0's" transmitted and provides an output labelled R' to an "AND" circuit 227. The other input to "AND" circuit 227 is the "E" bit gate pulse from the bit ring generator 65. The "R" bit generator furnishes an output to the "AND" circuit 227 whenever there is an odd number of "0" bits in the first four bits of each digit. The keyer thereupon causes the transceiver to transmit a "1" bit to make the number of "1" bits odd. Of course, this is the same as making the number of "0" bits in each digit even.

Now comparing FIG. 2 with the time chart of FIG. 4, it will be seen that the "S" gate pulse comes up before T' time. When T' arrives, at +10 volts output is available from gate circuit 219. A pulse of the binary "1" frequency is then transmitted for the length of T', which is 10 milliseconds. Since the "AND" circuit 219 provides an output at this time, the "AND" circuit 217 cannot provide an output because of the presence of the "S" gate pulse and the consequent lack of coincidence between T' and the other input to "AND" circuit 217. At the next T' time, the "S" gate pulse is not present, so that both inputs to "AND" circuit 217 are on and "AND" circuit 221 causes a "0" bit to be transmitted. Next, another "0" is transmitted and followed by a "1." The "R" bit generator counts the transmitted "0's" and provides an output at E time through gate circuit 227 to cause a "1" to be transmitted at T' time. The third digit is therefore complete and it will be seen that there is a "1" bit for the 8 and the 1 positions in that digit. This, of course, corresponds to 9 milliamps., indicating that the transducer output is at least of this amount.

The fourth and fifth digit times proceed in similar fashion to cause the appropriate bits to be transmitted, indicating 0.32 milliamp.

As has been indicated hereinabove, the master transceiver decodes these digits in the binary to digital converter 40 and may record the digits in decimal form through recorder 41.

It has already been indicated that the first two digits transmitted by the slave station represent the station which is transmitting and the transducer whose output is to be represented by the third through the fifth digits. The keying gate pulses and pulses for accomplishing transmission of the first two digits are obtained through apparatus now to be described.

Referring to FIG. 1, the station and function decode matrix 13 provides a station gate pulse over line 14 and a function gate pulse over line 33 to the encode matrix 30. The encode matrix, at the time of transmission of the first and second digits, supplies the appropriate bit gate pulses 1', 2', 4', and 8' to the transceiver. In the illustrative example, the slave station being examined has a code of decimal "6" and the transducer whose output is being transmitted has a code of decimal "3." The encode matrix therefore supplies 2' and 4' gate pulses to the transceiver during the first digit time and 1' and 2' gate pulses during the second digit time. The apparatus for accomplishing this particular function is not in itself important to this invention and design of such apparatus is completely within the skill of the art, so that the apparatus will not be more fully described.

Turning to FIG. 2, the "OR" circuit 215 is supplied with the outputs of "AND" circuits 230 through 233. "AND" circuit 230 receives the A gate pulse from the bit ring generator 65 and the "1'" gate pulse from the encode matrix. The "AND" circuit 231 receives the B gate pulse and the "2'" gate pulse from the same sources, while the "AND" circuit 232 and the "AND" circuit 233 respectively receive the 4' and C gate pulses and the 8' and D gate pulses from the same sources.

For the particular example given in the first digit time, there is no "1'" gate pulse at A time, so a binary "0" is transmitted by the slave transceiver at T' time. There is a 2' gate pulse, however, at B time and a binary "1" is therefore transmitted at T' time. Similarly, there is a 4' gate pulse at C time, but no 8' gate pulse at D time, so that a binary "1" and a binary "0" are sequentially transmitted. The transmission of the representation of the transducer during the second digit time is accomplished in the same manner and is shown in the time chart in FIG. 4.

The operation of the complete apparatus shown in the various figures of the drawings has been described in conjunction with individual figures. As indicated hereinabove, the apparatus described is intended to cycle continuously to request the output of a particular transducer at one slave station during a first time period, then to transmit that output, identified by the station and transducer code, to the master station during a second time period. During the next master station transmission, the output of a particular transducer at another slave station is requested and that output is transmitted back to the master station. Some of the various auxiliary features that can be accomplished with this type of apparatus have been described above. However, the inventive feature that is covered by this application is the direct interconnection between the analog to digital converter and the slave transceiver which permits transmission of converted transducer information without intermediate storage or translation. The bit ring generator of the transceiver, and the digit ring generator which is driven thereby, and the alternate control of the bit ring generator by the receiver bits and the local timer output enable this desirable objective to be achieved.

Since the important feature of the invention is embodied primarily in the slave station, the various elements of the master station have not been described in detail. These elements are conventional in the digital telemetering art, however.

The description hereinabove of the preferred embodiment of the invention has not included a description of the particular circuitry involved, but rather has described conventional elements in connection with block diagrams. Specifically, the various flip-flops, ring generators, oscillators, matrices, and digital to analog converters may be all of conventional design well known in the art.

The particular embodiment of the invention described herein employs the 1, 2, 4, 8 binary decimal code. However, any other fixed-weight code could be employed as long as the bits thereof have different fixed-weight numerical values. For instance, the 1, 2, 4, 5 code is in common use and could be employed in the system of this invention.

It will be evident that many changes can be made in the apparatus described above without departure from the scope of the invention. The invention therefore is not to be considered limited to the particular embodiment described but rather only by the scope of the appended claims.

I claim:

1. A digital telemetering system operable to cyclically transmit from each of a plurality of slave stations to a master station the instantaneous indication of the outputs of each of a plurality of transducers at each such slave station upon interrogation by the master station, comprising first means at the master station for alternately transmiting binary-coded decimal messages each of at least two digits each including at least four bits to all said slave stations requesting an indication of the output of one of said transducers at one of said slave stations and for receiving messages from each of said slave stations and recording the indications of said transducers contained in such messages, program means for controlling said first means to cyclically code the transmission thereof to request the outputs of sequential ones of said transducers at sequential ones of said slave stations, the first and second transmitted ones of said digits indicating by their respective decimal values the selected slave station and the selected transducer whose indication is to be thereafter reported to the master station; at each slave station: second means for alternately receiving messages from said master station and for transmitting binary-coded decimal messages each of at least three digits each including at least four bits to said master station, a signal comparator having a pair of signal inputs and operable when one of two input signals is the larger to furnish one output and to furnish a different output when the other signal is the larger, a commutator having the outputs of said plurality of transducers at that station connected thereto and operable to connect the output of a selected one of such transducers to one input of the comparator, third means connected between the output of said comparator and said second means operable to cause the second means to transmit one binary indication when the signal comparator furnishes said one output and to transmit the other binary indication when the signal comparator furnishes said different output, a timer for furnishing cyclic voltage pulses, fourth means including a bit ring generator operable when supplied with sequential voltage pulses to sequentially and cyclically supply a first set of four independent actuating pulses, said second means being operable to develop a voltage pulse for each bit received from said master station, fifth means connecting the voltage pulse output of said second means to said bit ring generator to cycle it while a message is being received from said master station, a digit ring generator operable when supplied with sequential voltage pulses to sequentially supply at least three independent voltage gate pulses, sixth means connecting one of said independent actuating pulses from said fourth means to said digit ring generator to cycle it while the bit ring generator cycles, a first one of said voltage gate pulses being coincident with the digit first received from the master station, seventh means for decoding the successive digits received from the master station, first coincidence means responsive to coincidence of said first voltage gate pulse and the decimal code of the partciular station to furnish an output, a second one of said voltage gate pulses being coincident with a second-received digit from the master station, second coincidence means responsive to coincidence of the output of said first coincidence means, said second voltage gate pulse and the decimal code of a particular transducer to select the transducer connected through said commutator to said one input of the comparator, the next one of said voltage gate pulses being subsequent to the digit last received from the master station and being operable to reset the digit ring generator and to connect the output of said timer to said bit ring generator to cycle it, eighth means supplied with the outputs of said first and second coincidence means and operable at the selected slave station during the succeeding first and second digit voltage gate pulses to cause said second means to transmit to the master station binary-coded decimal indications of the selected slave station and the selected transducer replying, at least one set of four sources of progressively lower amplitude signals in the 8, 4, 2, 1 progression, a corresponding plurality of switch means each operable when actuated to connect a different one of said sources to the other input of said comparator, each one of said actuating voltage pulses from said fourth means being supplied to a different one of said switch means to actuate them progressively in order during a third-generated one of said voltage gate pulses, each of said switch means normally remaining actuated after being actuated by said fourth means to connect a progressively higher amplitude signal to said other input of the comparator, ninth means connected between the output of said comparator and each of said switch means operable immediately after each switch means has been actuated to de-actuate it in the event said comparator provides said different output, indicating that said other signal is larger than said one signal, and tenth means responsive to the beginning of receipt of a message from the master station to de-actuate each of said switch means and to reset said bit and digit ring generators.

2. Apparatus for converting an analog signal into digital form comprising a signal comparator having a pair of signal inputs and operable when one of two input signals is the larger to furnish one output and to furnish a different output when the other signal is the larger, first means for connecting said analog signal to one input of said comparator, second means for generating one binary indication when the signal comparator furnishes said one output and for generating the other binary indication when the signal comparator furnishes said different output, a plurality of sources of progressively lower amplitude signals, a corresponding plurality of means each operable when actuated to connect a different one of said sources to the other input of said comparator, third means connected to said plurality of means for automatically sequentially actuating them, each of said plurality of means normally remaining actuated after being actuated by said third means to connect a progressively higher amplitude signal to said other input of said comparator, and fourth means connected between the output of said comparator and each of said plurality of means operable immediately after any one thereof has been actuated to de-actuate it in the event said comparator provides said different output, indicating that said other signal is larger than said one signal, and fifth means for de-actuating all of said plurality of means following completion of the actuation sequence.

3. Apparatus for converting an analog signal into digital form comprising a signal comparator having a pair of signal inputs and operable when one of two input signals is the larger to furnish one output and to furnish a different output when the other signal is the larger, first means for connecting said analog signal to one input of said comparator, second means for generating one binary indication when the signal comparator furnishes said one output and for generating the other binary indication when the signal comparator furnishes said different output, at least one set of four sources of progressively lower amplitude signals in the 8, 4, 2, 1 progression, a corresponding plurality of switch means each operable when actuated to connect a different one of said sources to the other input of said comparator, a timer for furnishing cyclic voltage pulses, third means operable when supplied with cyclic voltage pulses to furnish cyclically four sequential independent actuating voltage pulses, the cyclic voltage pulses from said timer being supplied to said third means, each one of said actuating voltage pulses from said third means being supplied to a different one of said switch means to actuate them progressively in order, each of said switch means normally remaining actuated after being actuated by said third means to connect a progressively higher amplitude signal to said other input of said comparator, fourth means connected between the output of said comparator and each of said switch means operable immediately after each switch means has been actuated to de-actuate it in the event said comparator provides said different output, indicating that said other signal is larger than said one signal, and fifth means for de-actuating all of said switch means.

4. Apparatus for converting an analog signal into digital form comprising a signal comparator having a pair of signal inputs and operable when one of two input signals is the larger to furnish one output and to furnish a different output when the other signal is the larger, first means for connecting said analog signal to one input of said comparator, second means for generating one binary indication when the signal comparator furnishes said one output and for generating the other binary indication when the signal comparator furnishes said different output, at least two sets of four sources of progressively lower amplitude signals in the 80, 40, 20, 10, 8, 4, 2, 1 progression, a corresponding plurality of switch means each operable when actuated to connect a different one of said sources to the other input of said comparator, a timer for furnishing cyclic voltage pulses, third means including a first ring generator operable when supplied with cyclic voltage pulses to sequentially and cyclically supply a first set of four independent actuating voltage pulses, the output of said timer being supplied to said first ring generator, fourth means including a second ring generator operable when supplied with a cyclic input voltage to sequentially supply a second set of at least two independent actuating voltage pulses, fifth means supplying one of said first set of actuating voltage pulses to said second ring generator, a plurality of coincidence means each connected to a different one of said switch means operable to actuate it when a pair of actuating voltage pulses is simultaneously supplied to the coincidence means, a first one of said second set of actuating voltage pulses being supplied to each of the set of four coincidence means associated with the 80, 40, 20, 10 sources and a second one of said second set of actuating voltage pulses being supplied to each of the other coincidence means, the first-generated one of said first set of actuating voltage pulses being supplied to the coincidence means associated with the 80 and 8 current sources, the second generated one of said first set of actuating voltage pulses being supplied to the coincidence means associated with the 40 and 4 current sources, the third-generated one of said first set of actuating voltage pulses being supplied to the coincidence means associated with the 20 and 2 current sources, and the fourth-generated one of said first set of actuating voltage pulses being supplied to the coincidence means associated with said 10 and 1 sources, each of said switch means normally remaining actuated after being actuated by said coincidence means to connect a progressively higher amplitude signal to said other input of said comparator, sixth means connected between the output of said comparator and each of said switch means operable immediately after each switch means has been actuated to de-actuate it in the event said comparator provides said different output, indicating that said other signal is larger than said one signal, and seventh means for de-actuating all of said switch means after actuation of the switch means associated with the 1 current source.

5. A digital telemetering system operable to transmit from at least one slave station to a master station the instantaneous indication of the output of a selected one of a plurality of transducers at each such slave station upon interrogation by the master station, comprising first means at the master station for alternately transmitting a digitally coded message to said slave station requesting an indication of the output of said selected transducer and for receiving messages from said slave station, second means at said slave station for alternately receiving messages from the master station and transmitting digitally-coded messages to the master station, a timer at the slave station for furnishing cyclic voltage pulses, third means at the slave station operable when supplied with cyclic voltage pulses to furnish cyclically sequential independent actuating voltage pulses, an analog to digital converter operable when supplied wtih sequential actuating voltage pulses and with the output of a transducer to supply keying gates to said second means to cause transmission of the digital equivalent of the output of that transducer, fourth means connected to the outputs of both said second means and said third means for connecting the transducer corresponding to the message received from the master station to said analog to digital converter, fifth means connecting the output of said second means to said third means during receipt of a message from the master station to cause sequential generation of said actuating voltage pulses, and sixth means connecting the output of said timer to said third means following completion of a received message from the master station to cause sequential generation of said actuating voltage pulses.

6. A digital telemetering system operable to cyclically transmit from each of a plurality of slave stations to a master station the instantaneous indication of the outputs of each of a plurality of transducers at each such slave station upon interrogation by the master station, comprising first means at the master station for alternately transmitting binary-coded decimal messages each of at least two digits including at least four bits to all slave stations requesting an indication of the output of one of said transducers at one of said slave stations and for receiving messages from each of said slave stations and recording the indications of said transducers contained in such messages, program means for controlling said first means to cyclically code the transmission thereof to request the outputs of sequential ones of said transducers at sequential ones of said slave stations, the first and second transmitted ones of said digits indicating by their respective decimal values the selected slave station and the selected transducer whose indication is to be thereafter reported to the master station; at each slave station: second means for alternately receiving messages from said master station and for transmitting binary-coded decimal messages each of at least three digits each including at least four bits to said master station, third means including a bit ring generator operable when supplied with sequential voltage pulses to sequentially and cyclically supply a first set of at least four independent actuating pulses, said second means being operable to develop a voltage pulse for each bit received from said master station, fourth means connecting the voltage pulse output of said second means to said bit ring generator to cycle it while a message is being received from said master station, a digit ring generator operable when supplied with sequential voltage pulses to sequentially supply at least three independent digit voltage gate pulses, fifth means connecting one of said independent actuating pulses from said third means to said digit ring generator to cycle it while the bit ring generator cycles, a first one of said digit gates pulses being coincident with the digit first received from the master station, sixth means for decoding the successive digits received from the master station, first coincidence means responsive to coincidence of said first digit gate pulse and the decimal code of the particular station to furnish an output, a second one of said digit gate pulses being coincident wtih a second-received digit from the master station; an analog to digital converter operable when supplied with a least the third one of said digit gate pulses, said sequential actuating pulses from said bit ring generator and the output of a transducer to supply sequential keying gate pulses to said second means to cause transmission of the digital equivalent of the output of said transducer; a second coincidence means responsive to coincidence of the output of said first coincidence means, said second digit gate pulse and the decimal code of a particular transducer to select the transducer connected to said analog to digital converter, the third one of said digit gate pulses being subsequent to the digit last received from the master station and being operable to reset the digit ring generator and to connect the output of said timer to said bit ring generator to cycle it, seventh means supplied with the outputs of said first and said second coincidence means and operable at the selected slave station during the succeeding first and second digit gate pulses to cause said second means to transmit to the master station binary-coded decimal indications of the selected slave station and the selected transducer replying, eighth means operable during the succeeding third digit gate pulse to supply said third gate pulse and said sequential actuating pulses to said analog to digital converter to cause transmission of the binary-coded-decimal equivalent of the output of the selected transducer from the slave station to the master station during at least said third digit gate pulse, and eighth means responsive to the beginning of receipt of a message from the master station to reset said bit and digit ring generators.

References Cited in the file of this patent

UNITED STATES PATENTS

| | | |
|---|---|---|
| 2,717,370 | Piper | Sept. 6, 1955 |
| 2,719,284 | Roberts et al. | Sept. 27, 1955 |
| 2,754,503 | Forbes | July 10, 1956 |
| 2,784,396 | Kaiser et al. | Mar. 5, 1957 |
| 2,896,198 | Bennett | July 21, 1959 |